US008640230B2

(12) United States Patent
Greenwood et al.

(10) Patent No.: US 8,640,230 B2
(45) Date of Patent: Jan. 28, 2014

(54) INTER-THREAD COMMUNICATION WITH SOFTWARE SECURITY

(75) Inventors: Jason Greenwood, Rochester, MN (US); Mark G. Kupferschmidt, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 13/329,583

(22) Filed: Dec. 19, 2011

(65) Prior Publication Data

US 2013/0160114 A1  Jun. 20, 2013

(51) Int. Cl.
*G06F 12/00* (2006.01)

(52) U.S. Cl.
USPC .......................................................... 726/21

(58) Field of Classification Search
USPC ............................................. 726/2, 4, 17, 21
See application file for complete search history.

(56) References Cited

U.S. PATENT DOCUMENTS

| 7,769,893 | B2 | 8/2010 | Goossens |
| 7,873,066 | B2 | 1/2011 | Muff et al. |
| 2009/0031402 | A1* | 1/2009 | Jung et al. .......................... 726/4 |
| 2009/0089861 | A1* | 4/2009 | Catalano et al. ................... 726/3 |
| 2009/0282197 | A1 | 11/2009 | Comparan et al. |
| 2009/0282211 | A1 | 11/2009 | Hoover et al. |

\* cited by examiner

*Primary Examiner* — Brandon Hoffman
*Assistant Examiner* — Anthony Brown
(74) *Attorney, Agent, or Firm* — Wood, Herron & Evans, LLP

(57) ABSTRACT

A circuit arrangement and method utilize a process context translation data structure in connection with an on-chip network of a processor chip to implement secure inter-thread communication between hardware threads in the processor chip. The process context translation data structure maps processes to inter-thread communication hardware resources, e.g., the inbox and/or outbox buffers of a NOC processor, such that a user process is only allowed to access the inter-thread communication hardware resources that it has been granted access to, and typically with only certain types of authorized access types. Moreover, a hypervisor or supervisor may manage the process context translation data structure to grant or deny access rights to user processes such that, once those rights are established in the data structure, user processes are permitted to perform inter-thread communications without requiring context switches to a hypervisor or supervisor in order to handle the communications.

23 Claims, 7 Drawing Sheets

| Valid | Context | Permissions | ITC ID |
|---|---|---|---|
| 1 | PID=0x62 | Send | 2 |
| 1 | PID=0x2A | Send | 5 |
| 1 | PID=0x00 | Broadcast | 3 |
| 1 | PID=0x1B | Receive | 5 |
|  |  |  |  |
| 1 | PID=0x0D | Send | 2 |
|  |  |  |  |
| 1 | PID=0x52 | Receive | 2 |
|  |  |  |  |
|  |  |  |  |

204 Valid, 206 Context, 208 Permissions, 210 ITC ID, 212, 202, 200

INTER-THREAD COMMUNICATION WITH SOFTWARE SECURITY

FIELD OF THE INVENTION

The invention is generally related data processing in a computing system including a plurality of interconnected hardware threads, and to processor architectures and communication architectures having secured data communications incorporated therein.

BACKGROUND OF THE INVENTION

A network on a chip (NOC) is a novel integrated circuit architecture that applies a network-based architecture to a single chip to create a unique processing unit. A typical NOC includes a plurality of integrated processor (IP) blocks coupled to one another via an on-chip network. NOC processing units typically distribute (i.e., allocate) various parts of a job to different hardware threads of one or more IP blocks to be executed by the one or more IP blocks in the NOC processing unit, where the distribution typically includes transmitting data packets including one or more data words between one or more hardware threads of the NOC. With the number of IP blocks in the standard computer systems expected to rise, efficiently handling workload distribution has become increasingly demanding.

In many conventional NOC architecture systems, inter-thread communication is performed by transmitting data packets ("messages") between hardware threads using the on-chip network. In some NOC architecture systems, an inbox/outbox model is used, whereby transmitting data packets is often referred to as "message passing," and conventionally a message (i.e., a data packet) is transmitted from an output buffer (i.e., an "outbox") of a first hardware thread to an input buffer (i.e., an "inbox") of a second hardware thread over the network of the NOC. Such conventional implementations are typically referred to as "direct inter-thread communication" messaging (hereinafter "DITC"). As such, each hardware thread of a DITC implementation includes inter-thread communication hardware resources (e.g., an inbox and an outbox) connected to the on-chip network. In other NOC systems, various other inter-thread communication hardware resources are utilized to facilitate message passing on the on-chip network. Generally, these inter-thread communication hardware resources associated with a hardware thread receive messages from the network and the data is received from the resource into an execution register file connected to an execution unit of a hardware thread such that the data may be processed by the execution unit during execution of instructions. Similarly, following processing, output data may be sent to a inter-thread communication hardware resource for communication to one or more other hardware threads via the on-chip network.

Inter-thread communication via inter-thread communication hardware resources has generally led to increased workload distribution efficiency. However, in some situations, data passed in messages on the on-chip network using inter-thread communication hardware resources is generally not secured. As such, hardware threads executing instructions on behalf of a low-level processes may corrupt data buffers of inter-thread communication hardware resources by moving data to and from buffers of inter-thread communication hardware resources. As such, in many NOC architectures, inter-thread communications may be reserved for hypervisor or supervisor features and not for user mode processes to prevent user mode processes from potentially corrupting buffers associated with inter-thread communication hardware resources.

In addition, due to the increasing numbers of threads being supported in typical processing units, security of confidential data, even among different threads on the same chip, becomes more important, particularly, for high security applications, since different threads in the same processing unit may be executing different processes on behalf of completely different users, providing a potential avenue for a malicious process running on one thread to attack another process running on a different thread.

Therefore, a continuing need exists in the art for a manner of securing data in inter-thread network communication architectures such as NOC architectures.

SUMMARY OF THE INVENTION

The invention addresses these and other problems associated with the prior art by utilizing a process context translation data structure in connection with an on-chip network of a processor chip to implement secure inter-thread communication between hardware threads in the processor chip. The process context translation data structure maps one or more processes to one or more inter-thread communication hardware resources, e.g., the inbox and/or outbox buffers of a NOC processor, such that a user process is only allowed to access the inter-thread communication hardware resources that it has been granted access to, and typically with only certain types of authorized access types. Moreover, in some embodiments of the invention, a hypervisor or supervisor manages the process context translation data structure to grant or deny access rights to user processes; however, once those rights are established in the data structure, user processes are typically permitted to perform inter-thread communications without requiring context switches to a hypervisor or supervisor in order to handle the communications.

Consistent with one aspect of the invention, data is securely communicated within a processor chip that includes a plurality of hardware threads coupled to one another in an on-chip network of a network on chip (NOC) arrangement. In response to a request by a respective hardware thread on behalf of a respective process to access a respective inter-thread communication hardware resource connected to the on-chip network, permission data from a process context translation data structure is accessed, where the process context translation data structure maps each of a plurality of processes to a plurality of inter-thread communication hardware resources and stores permission data for each mapped process, and where the permission data indicates which inter-thread communication hardware resources each mapped process is permitted to access. A determination is made from the permission data whether the respective process is permitted to access the respective inter-thread communication hardware resource, and in response to determining that the respective process is not permitted to access the respective inter-thread communication hardware resource, the request to access the respective inter-thread communication hardware resource is denied.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention utilize a process context translation data structure in connection with an on-chip network of a processor chip to implement secure inter-thread communication between hardware threads in the processor chip. The process context translation data structure maps processes to inter-thread communication hardware resources, e.g., the inbox and/or outbox buffers of a NOC processor, such that a user process is only allowed to access the inter-thread communication hardware resources that it has been granted access to, and typically with only certain types of authorized access types. Moreover, a hypervisor or supervisor typically manages the process context translation data structure to grant or deny access rights to user processes such that, once those rights are established in the data structure, user processes are permitted to perform inter-thread communications without requiring context switches to the hypervisor or supervisor in order to handle the communications.

A process context data structure may be implemented, for example, as a translation table including entries that map one or more contexts, e.g., identifying one or more processes, to one or more inter-thread communication resource identifiers for one or more inter-thread communication hardware resources, to selectively grant or deny requests to access the inter-thread communication hardware resources.

Other variations and modifications will be apparent to one of ordinary skill in the art. Therefore, the invention is not limited to the specific implementations discussed herein.

Hardware and Software Environment

Figure 1:
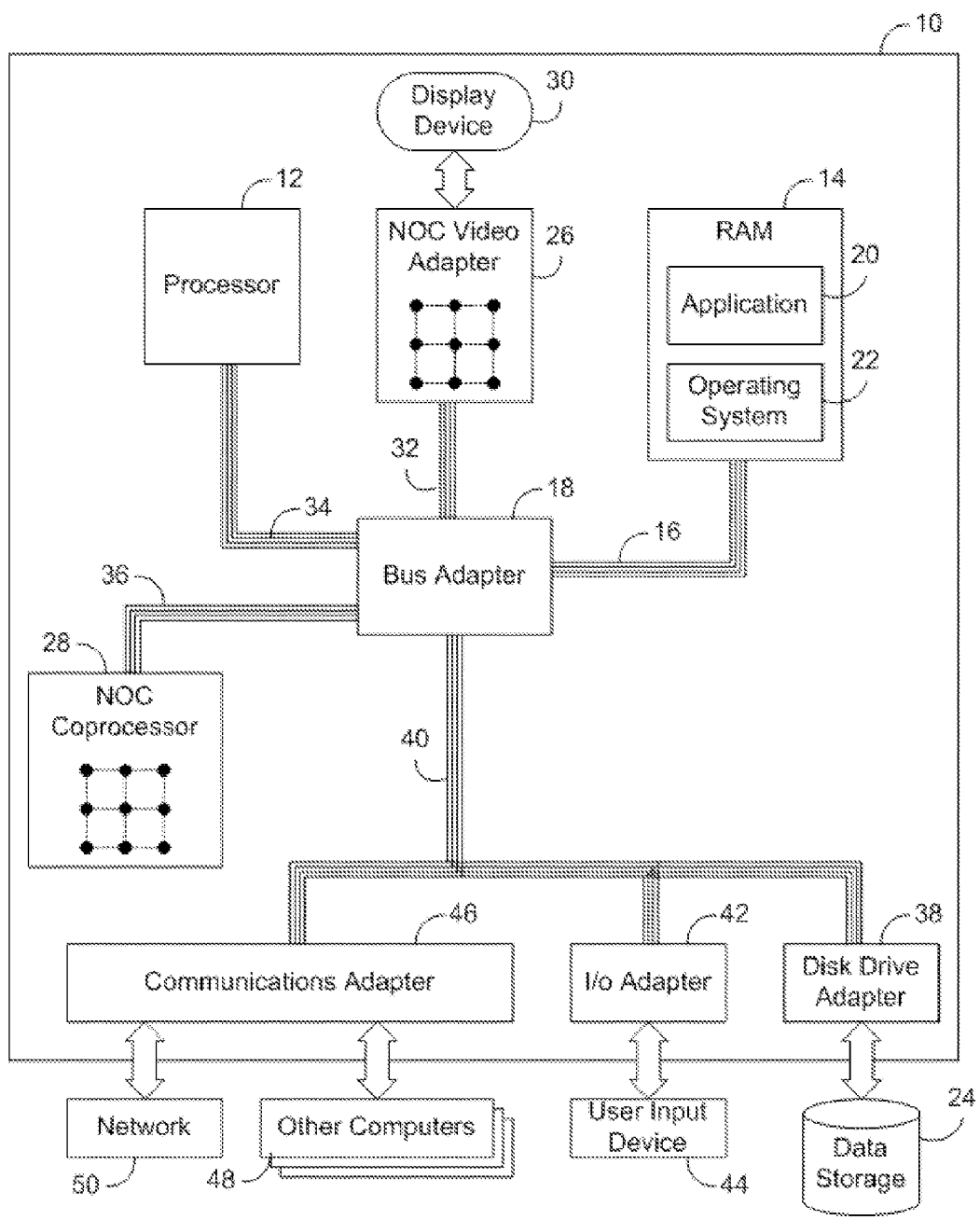
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI')

adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
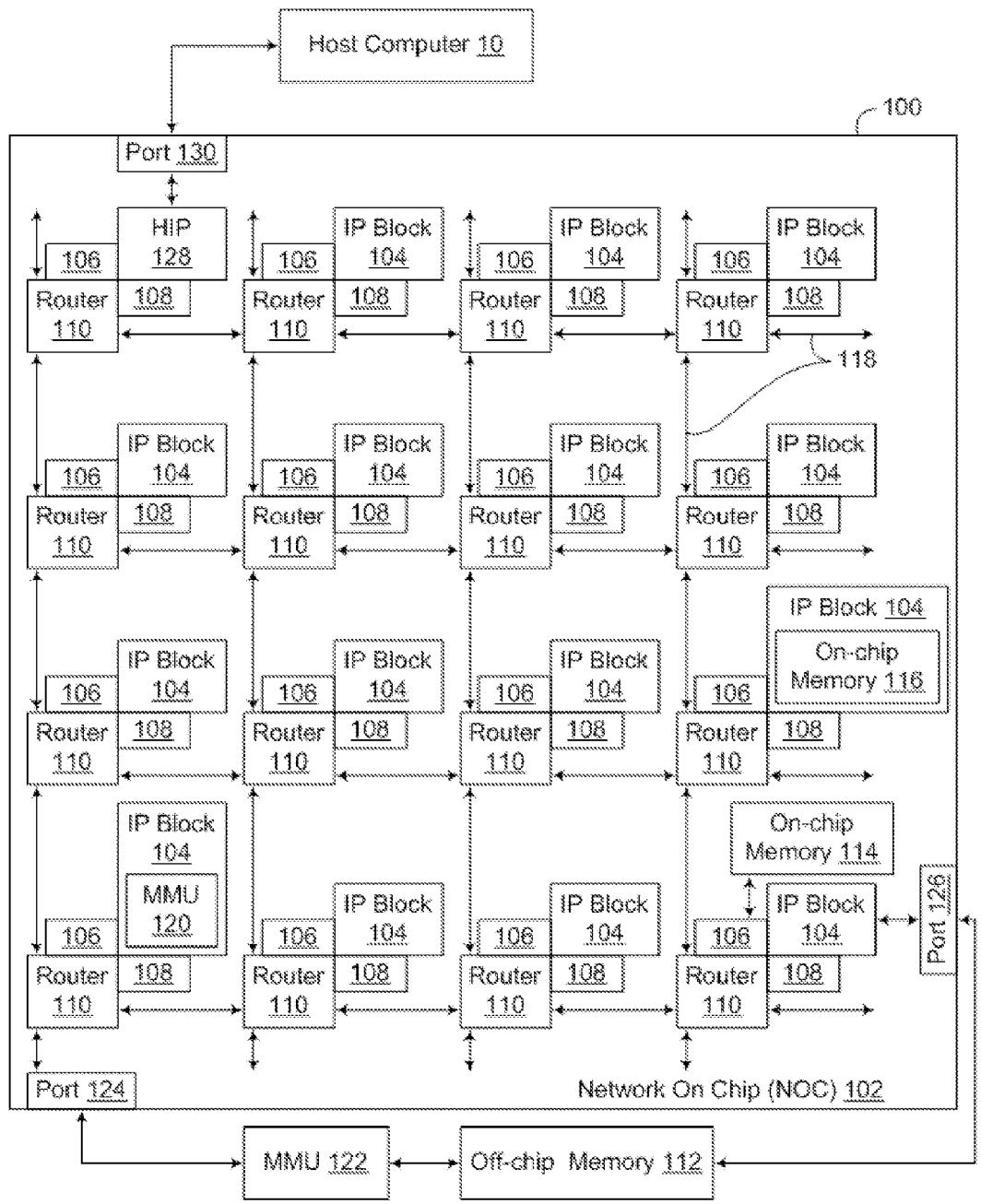
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CDROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the offchip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
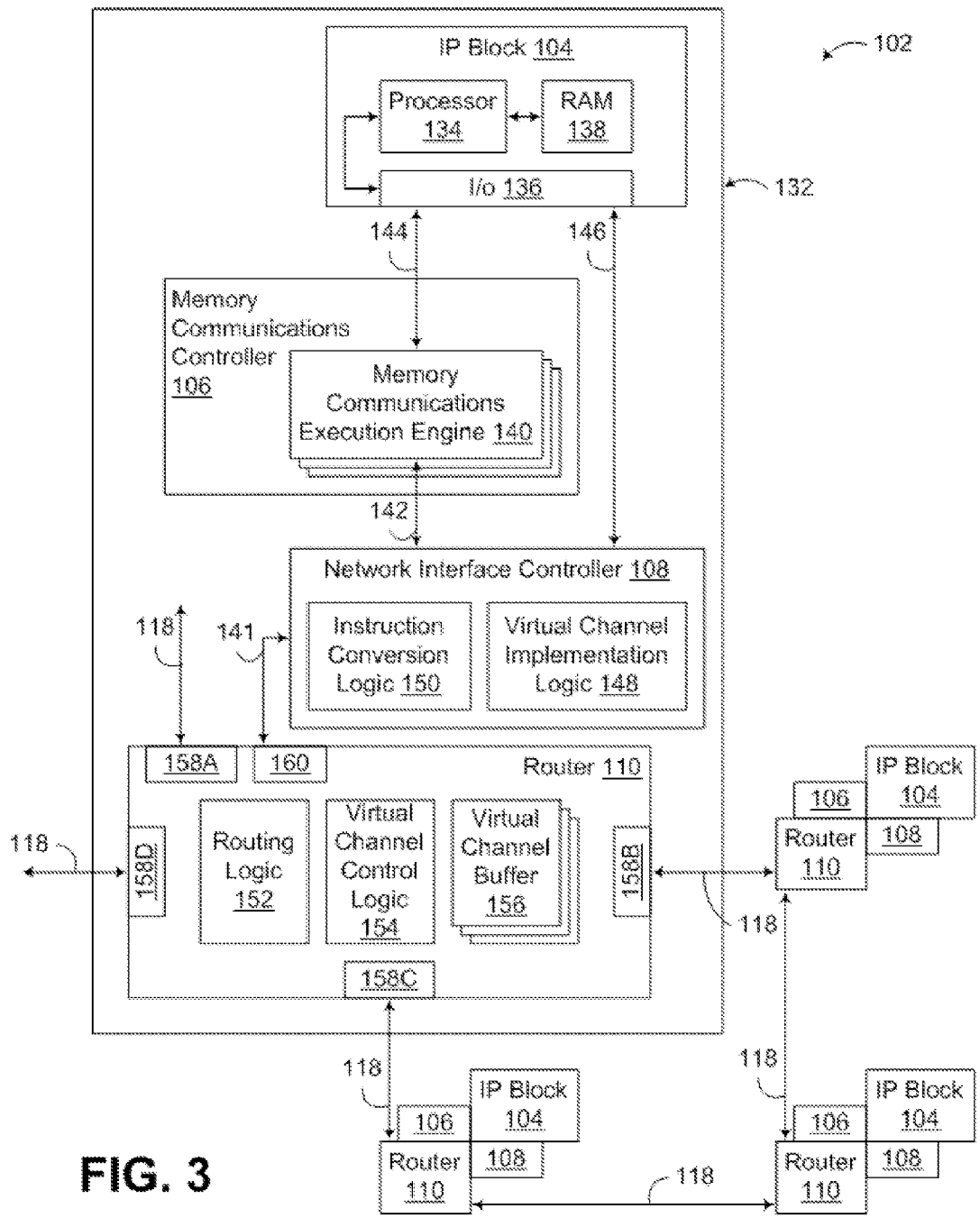
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
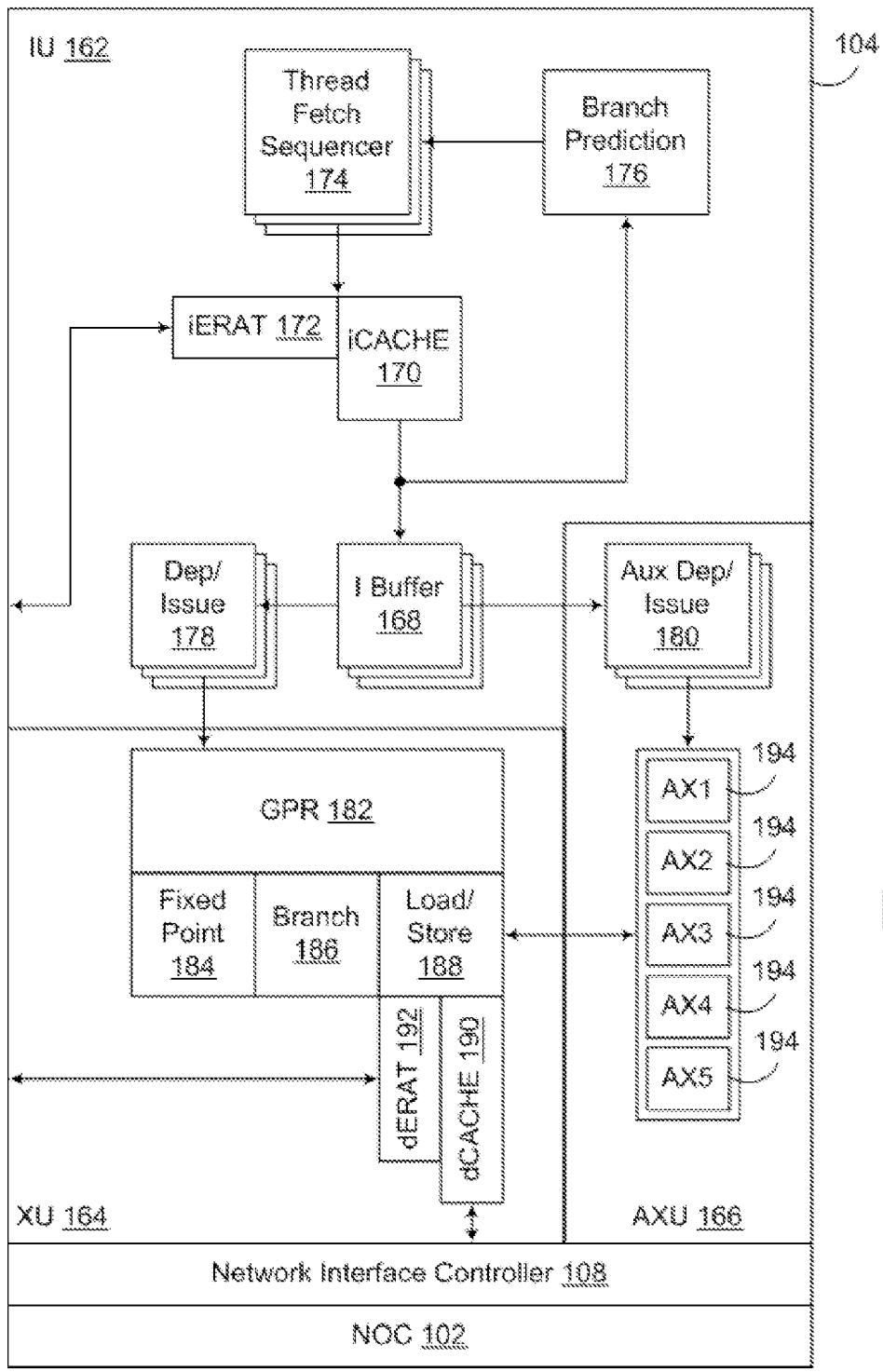
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Inter-Thread Communication with Software Security

With the number of threads rising in standard computer systems, it is increasingly desirable to support a secure way to handle workload distribution and message passing between threads and processes. Embodiments of the invention addresses these concerns by provide secure inter-thread communication between hardware threads coupled to one another over an on-chip network in a NOC-based processor chip.

Conventionally, several approaches have been used for workload distribution and message passing between threads in a multithreaded environment, primarily broken down between memory-based inter-thread communication and non-memory-based inter-thread communication (ITC) implementations. For security, memory-based inter-thread communication typically relies on memory attributes to ensure system security. For example, a user process may or may not be allowed to store to a particular page in memory. All memory access is based on an effective address, then translated into a real address with attributes. If a user process accesses memory it's not supposed to, the hypervisor or supervisor is notified, keeping memory secure.

In contrast, no existing security measures exist for inter-thread communication implementations, and as a result, inter-thread communication has typically been relegated to a hypervisor or supervisor feature to ensure that user processes do not either corrupt the inter-thread communication message buffers or otherwise attempt to perform malicious activities.

By restricting inter-thread communication to hypervisor or supervisor-mode operations, however, efficiency is lost, and thus performance is adversely impacted, because processes are required to switch to a hypervisor or other supervisor, e.g., a guest operating system, in order to communicate messages over an inter-thread communication implementation.

Embodiments consistent with the invention, on the other hand, utilize a process context translation data structure that translates between a process context and an inter-thread communication resource identification to implement access control of user processes to inter-thread communication hardware resources, e.g., inter-thread communication buffers such as inboxes and outboxes. If no translation exists, or an access violation is detected, a request may be denied, and an interrupt may be generated, allowing the hypervisor or supervisor the ability to update the process context translation data structure or perform an alternative action. Otherwise, a request is typically granted, typically enabling data to be moved between a register of a register file and a specified inter-thread communication hardware resource.

The process context translation data structure is typically maintained by the hypervisor or supervisor, allowing user processes to request access to inter-thread communication buffer(s) and other inter-thread communication hardware resources, identified, for example, by inter-thread communication resource identifiers, such as ITC ID's.

Figures 5, 6:
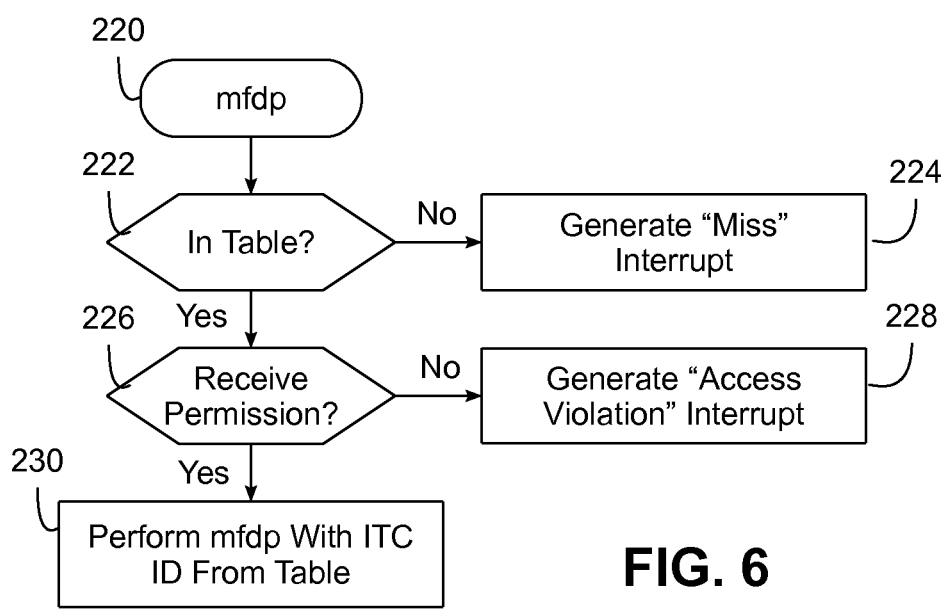
FIG. 5 is a block diagram of an exemplary process context data structure suitable for implementing secure inter-thread communications consistent with the invention.
FIG. 6 is a flowchart illustrating an exemplary sequence of operations for handling a receive operation using the process context data structure of FIG. 5.

FIG. 5, for example, illustrates an exemplary process context data structure implemented as a translation table 200 including a plurality of entries 202. A valid field 204 identifies whether an entry 202 is valid, and a context field 206 in each entry is used as the key, or primary field, for identifying a process (referred to herein as a mapped process) that is mapped to one or more inter-thread communication hardware resources by the entry. For example, in a PowerPC Embedded environment, the context field may include a process identifier (PID), as well as additional data such as logical partition identification register (LPIDR), machine state register problem state bit (MSR[PR]), and machine state register guest state bit (MSR[GS]), along with other potential hardware fields such as an encoded thread identifier (Thread ID). In other environments, however, other information may be used to unique identify one or more processes with which an entry may be associated.

The table includes access data that allows per-action permissions, identified in field 208, to block instructions from performing certain actions on certain inter-thread communication hardware resources, identified by ITC ID field 210. In addition, there may be fields of the context, such as PID=0, that match against all possible values, or against multiple processes. In the example illustrated in FIG. 5, for example, all threads with other matching contexts of entry 212 except PID would be allowed to broadcast on ITC ID 3.

Management of ITC ID field 210 is typically required to ensure that no two ITC ID's, also referred to herein as inter-thread communication resource identifiers, share the same data structures for sending, broadcasting, and receiving messages. In addition, in the illustrated embodiments the ITC ID allows software to control not only the sender, but the receiver of each inter-thread communication.

FIG. 6, for example, illustrates a receive or read operation 220, e.g., as initiated by an mfdp instruction corresponding to "move from data port," that may be performed by a thread to receive data from an inter-thread communication hardware resource such as an inbox. The mfdp instruction is issued, and the translation table is accessed to determine if the thread executing the mfdp instruction is present in the table, i.e., is executing on behalf of a process matching the context specified by any entry in the table (block 222). If there is no table entry for the thread, a "miss" interrupt is generated (block 224). Otherwise, if a table match is found, permissions from the entry are checked (block 226), and if the permission corresponding to the instruction, here receive permission, is not available, an "access violation" interrupt is generated (block 228). Otherwise, if the table entry specifies receive permission, the instruction is allowed to receive from the data port(s) for the ITC ID in the table (block 230).

It will be appreciated that it will typically be up to the implementation to determine if a core or IP block routes miss and/or access violation interrupts to existing interrupt vectors or creates new interrupt vectors, and is typically desirable to include along with an interrupt status information to enable a hypervisor or supervisor to determine which type of interrupt occurred so that appropriate actions may be taken.

Figure 7:
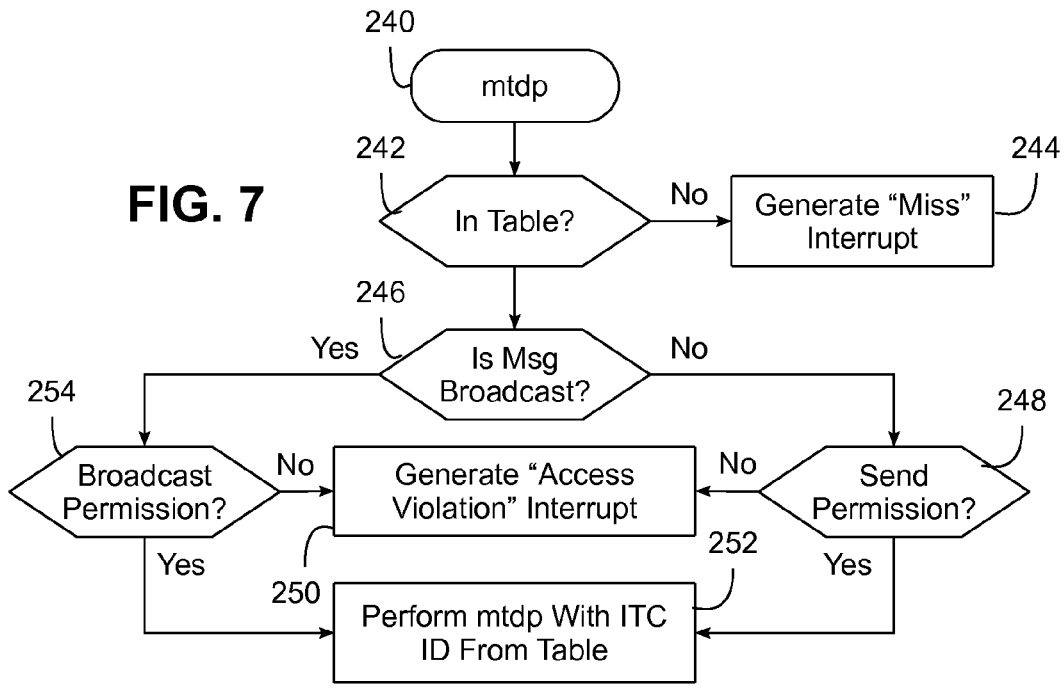
FIG. 7 is a flowchart illustrating an exemplary sequence of operations for handling a send operation using the process context data structure of FIG. 5.

FIG. 7 next illustrates a send or write operation 240, e.g., as initiated by an mtdp instruction corresponding to "move to data port," that may be performed by a thread to send data to an inter-thread communication hardware resource such as an outbox. The mtdp instruction is issued, and the translation table is accessed to determine if the thread executing the mtdp instruction is present in the table, i.e., is executing on behalf of a process matching the context specified by any entry in the table (block 242). If there is no table entry for the thread, a "miss" interrupt is generated (block 244). Otherwise, if a table match is found, block 246 determines whether the message to be communicated is a broadcast message, as opposed to a direct thread-to-thread communication.

If the message to be communicated is not a broadcast message, permissions from the entry are checked (block 248), and if the permission corresponding to the instruction, here send permission, is not available, an "access violation" interrupt is generated (block 250). Otherwise, if the table entry specifies send permission, the instruction is allowed to send from the data port(s) for the ITC ID in the table (block 252).

If the message to be communicated is a broadcast message, block 246 passes control to block 54 to check permissions from the entry, and if the permission corresponding to the instruction, here broadcast permission, is not available, an "access violation" interrupt is generated (block 250). Otherwise, if the table entry specifies broadcast permission, the instruction is allowed to send from the data port(s) for the ITC ID in the table (block 252).

In the illustrated embodiment, a hypervisor or supervisor is typically responsible for maintaining the translation table based on its own state, in much the same manner as a hypervisor or supervisor maintains an address translation data structure such as an ERAT, TLB or page table. For example, in the Power PC environment, maintenance of a translation table by a hypervisor or supervisor may be performed using hypervisor or supervisor privileged instructions similar to those used to support address translation, e.g., TLB management instructions such as tlbwe, etc. It will be appreciated that implementation of such management instructions to support hypervisor and/or supervisor control over a process context translation data structure would be well within the abilities of one of ordinary skill in the art having the benefit of the instant disclosure.

In addition, it will be appreciated that once a user mode process has the ability to communicate, the user mode process is permitted to communicate securely without context switching until it is done or the entry is lost. If maintained, user mode processes are also unable to corrupt inter-thread communication hardware resources, e.g., message buffers used by other user mode processes.

Figure 8:
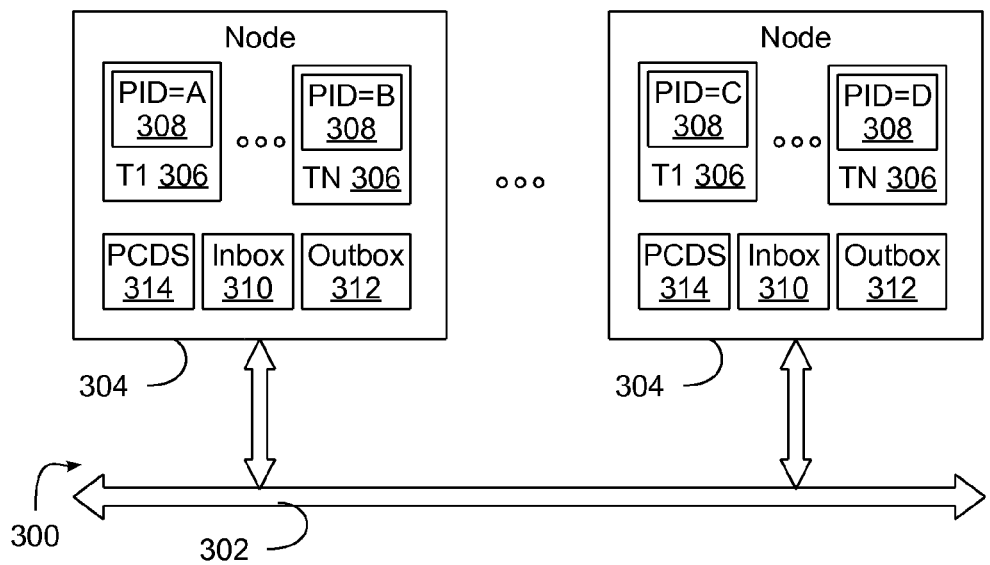
FIG. 8 is a block diagram of an exemplary data processing system incorporating secure inter-thread communications consistent with the invention.

FIG. 8 illustrates an exemplary data processing system 300 suitable for implementing secure inter-thread communication consistent with the invention. System 300 is illustrated with an on-chip network 302, e.g., a NOC on-chip network as described above in connection with FIGS. 1-4, coupling together a plurality of processing cores or nodes 304. While only two nodes 304 are illustrated in FIG. 8, it will be appreciated that any number of nodes may be utilized in different embodiments of the invention, and that additional components, e.g., memory controllers, off-chip data ports, etc., may be coupled to network 302.

Each node 304 is an SMT core including a plurality (N) of hardware threads 306, each of which is configured to execute a process 308, e.g., a user mode process or a process associated with a hypervisor or supervisor. To support inter-thread communication, one or more inter-thread communication hardware resources, e.g., one or more inbox buffers 310 and outbox buffers 312 are provide in each node. Furthermore, to support secure inter-thread communications, each node 304 also includes a process context data structure 314, e.g., as discussed above in connection with FIG. 5.

In addition, it will be appreciated that the components illustrated in FIG. 8 may be integrated onto the same integrated circuit device, or chip. In one embodiment, for example, each node 304 is implemented as an IP block in a NOC arrangement, and on-chip network 302 is integrated onto the same chip as the nodes in a SOC arrangement.

Figure 9:
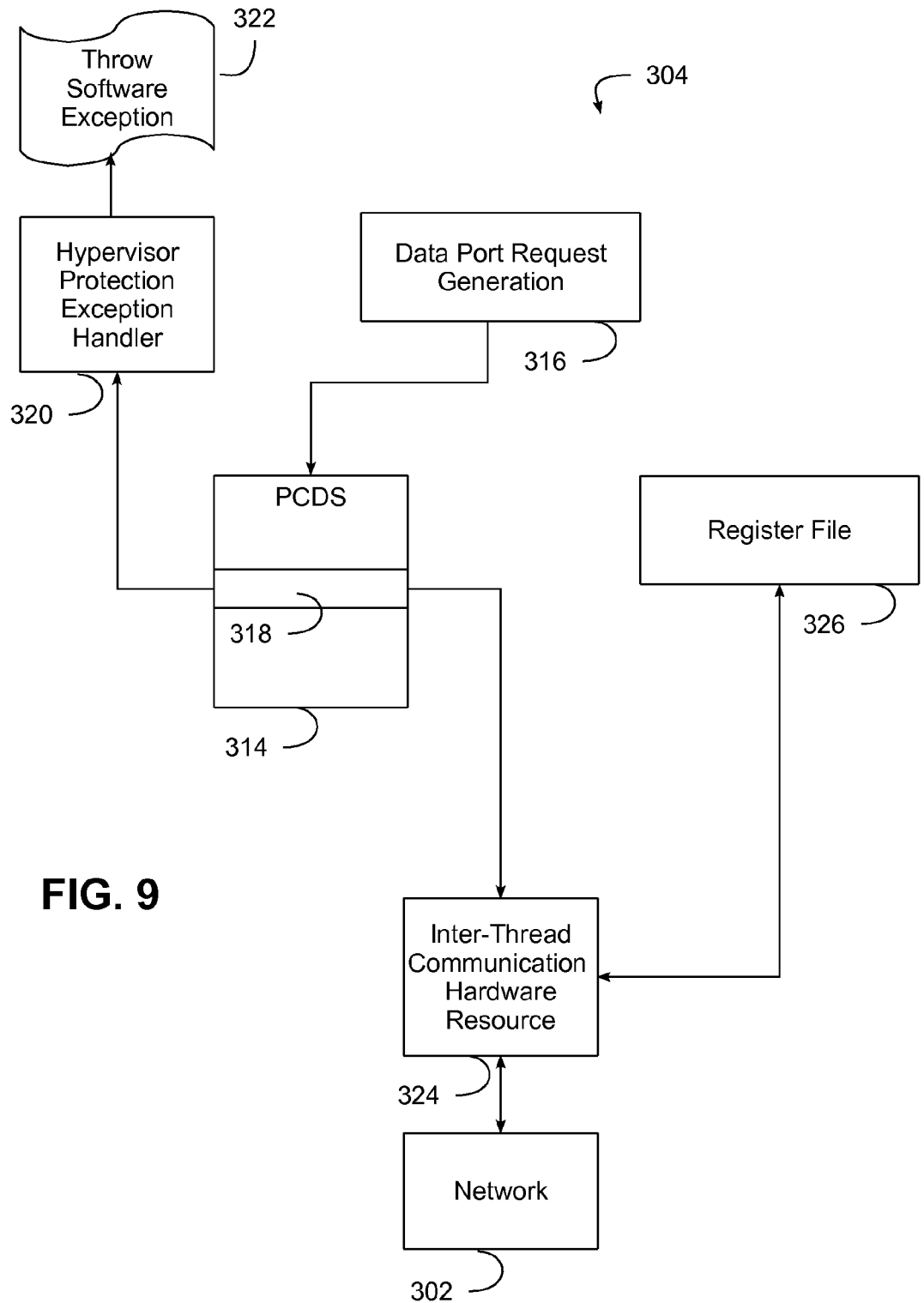
FIG. 9 is a block diagram illustrating handling of an access request in a node from the data processing system of FIG. 8.

In order to perform a secure inter-thread communication, as illustrated in FIG. 9, for example, a data port request, e.g., a mfdp or mtdp instruction, may initiate the generation of a data port request (block 316), which accesses process context data structure 314 to attempt to locate an entry 318 matching the context of the requesting process. Hardware logic, e.g., hypervisor protection exception handler logic 320, may be used to detect a failure to locate an entry for a mapped process in the data structure or the lack of the requested access permission for a process that is mapped in the data structure. This logic may be implemented, for example, alongside or within a dERAT, e.g., dERAT 192 of FIG. 4, or elsewhere within a node.

If an access violation occurs as a result of the context not being authorized to perform the requested access, logic 320 signals an interrupt by throwing a software exception to hypervisor or supervisor-level software, as represented at 322. On the other hand, if authorized, the request is processed, e.g., by performing a move between an inter-thread communication hardware resource 324 (e.g., an inbox or outbox buffer) and a register file 326 in node 304.

Therefore, embodiments consistent with the invention add software-based security to inter-thread communication implementations in a relatively lightweight manner, and often eliminating the need to perform context switches from user processes to a hypervisor or other supervisor code to perform inter-thread communications.

Various modifications may be made to the illustrated embodiments without departing from the spirit and scope of the invention. For example, ITC IDs may be implemented in a number of manners to identify one or more inter-thread communication hardware resources, as may contexts to identify one or more processes, such that one-to-one, one-to-many, many-to-one and/or many-to-many mappings may be supported between processes and inter-thread communication hardware resources.

In addition, various types of inter-thread communication hardware resources may be supported depending upon the type of on-chip network implemented, e.g., various inbox buffers, outbox buffers, etc. Furthermore, various data structures other than a table may be used to implement a process context translation data structure consistent with the invention.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for securely communicating data within a processor chip that includes a plurality of hardware threads coupled to one another in an on-chip network of a network on chip (NOC) arrangement, the method comprising:
    in response to a request by a respective hardware thread on behalf of a respective process to access a respective inter-thread communication hardware resource connected to the on-chip network, accessing permission data from a process context translation data structure, wherein the process context translation data structure maps each of a plurality of processes to a plurality of inter-thread communication hardware resources, and stores permission data for each mapped process, the permission data indicating which inter-thread communication hardware resources each mapped process is permitted to access;
    determining from the permission data whether the respective process is permitted to access the respective inter-thread communication hardware resource; and
    in response to determining that the respective process is not permitted to access the respective inter-thread communication hardware resource, denying the request to access the respective inter-thread communication hardware resource;
wherein the permission data indicates, for each mapped process, one or more access types for one or more inter-thread communication hardware resources, wherein the one or more access types includes a receive type access type and a send type access type, the receive type access type authorizing a process to receive data from an inter-thread communication hardware resource, and the send type access type authorizing a process to send data to an inter-thread communication hardware resource.

2. The method of claim 1, wherein determining whether the respective process is permitted to access the respective inter-thread communication hardware resource includes determining whether the respective process is a mapped process in the process context translation data structure.

3. The method of claim 2, further comprising determining that the respective process is not permitted to access the respective inter-thread communication hardware resource in response to determining that the respective process is not a mapped process.

4. The method of claim 1, wherein the request by the respective hardware thread on behalf of the respective process to access the respective inter-thread communication hardware resource comprises a request to receive data from the respective inter-thread communication hardware resource by the respective hardware thread on behalf of the respective process, and wherein the method further comprises granting the request to access the respective inter-thread communication hardware resource based at least in part on the permission data associated with the respective process indicating that the respective process is permitted to perform a receive type access of the respective inter-thread communication hardware resource.

5. The method of claim 1, wherein the request by the respective hardware thread on behalf of the respective process to access the respective inter-thread communication hardware resource comprises a request to send data to the respective inter-thread communication hardware resource by the respective hardware thread on behalf of the respective process, and wherein the method further comprises granting the request to access the respective inter-thread communication hardware resource based at least in part on the permission data associated with the respective process indicating that the respective process is permitted to perform a send type access of the respective inter-thread communication hardware resource.

6. The method of claim 1, wherein the permission data associated with each mapped process in the process context translation data structure includes data indicating a process identifier corresponding to each mapped process, a inter-thread communication resource identifier corresponding to each inter-thread communication hardware resource associated with the mapped process, and access data indicating an access type that the mapped process is permitted for the inter-thread communication hardware resource corresponding to the inter-thread communication resource identifier.

7. The method of claim 6, wherein determining whether the respective process is permitted to access the respective inter-thread communication hardware resource includes determining whether a process identifier corresponding to the respective process is stored in permission data of the process context translation data structure.

8. The method of claim 7, wherein determining whether the respective process is permitted to access the respective inter-thread communication hardware resource includes, in response to determining that a process identifier corresponding to the respective process is stored in the process context translation data structure, determining whether the process identifier corresponding to the respective process is associated with an inter-thread communication resource identifier corresponding to the respective inter-thread communication hardware resource, and whether the access data corresponding to the inter-thread communication resource identifier indicates that the respective process is permitted to access the respective inter-thread communication hardware resource.

9. The method of claim 1, further comprising:
    executing an instruction on the respective hardware thread on behalf of the respective process; and
    during execution of the instruction, requesting access the respective inter-thread communication hardware resource.

10. The method of claim 1, wherein denying the request to access the respective inter-thread communication hardware resource includes signaling an exception to a hypervisor or supervisor.

11. The method of claim 1, further comprising, in response to determining that the respective process is permitted to access the respective inter-thread communication hardware resource, granting the request to access the respective inter-thread communication hardware resource by moving data between the respective inter-thread communication hardware resource and a register from a register file.

12. The method of claim 1, wherein the process context translation data structure includes a translation table including an entry for each mapped process, wherein each entry includes a process identifier corresponding to at least one mapped process, an inter-thread communication resource identifier for at least one inter-thread communication hardware resource associated with the mapped process of the entry, and access data indicating an access type for the mapped process of the entry and the inter-thread communication hardware resource corresponding to the inter-thread communication resource identifier included in the entry.

13. The method of claim 12, wherein determining whether the respective process is permitted to access the respective inter-thread communication hardware resource includes determining whether any entry of the translation table includes a process identifier corresponding to the respective process.

14. The method of claim 1, wherein the plurality of hardware threads are disposed in a plurality of nodes interconnected by the on-chip network.

15. A circuit arrangement, comprising:
a processor chip including an on-chip network; and
a plurality of nodes disposed on the processor chip and coupled to the on-chip network in a network on chip (NOC) arrangement, wherein each node among the plurality of nodes includes at least one hardware thread;
wherein a first node among the plurality of nodes is configured to, in response to a request by a respective hardware thread in the first node on behalf of a respective process to access a respective inter-thread communication hardware resource connected to the on-chip network, access permission data from a process context translation data structure, wherein the process context translation data structure maps each of a plurality of processes to a plurality of inter-thread communication hardware resources and stores permission data for each mapped process, wherein the permission data indicates which inter-thread communication hardware resources each mapped process is permitted to access, wherein the first node is further configured to determine from the permission data whether the respective process is permitted to access the respective inter-thread communication hardware resource, and in response to determining that the respective process is not permitted to access the respective inter-thread communication hardware resource, deny the request to access the respective inter-thread communication hardware resource, wherein the permission data indicates, for each mapped process, one or more access types for one or more inter-thread communication hardware resources, and wherein the one or more access types includes a receive type access type and a send type access type, the receive type access type authorizing a process to receive data from an inter-thread communication hardware resource, and the send type access type authorizing a process to send data to an inter-thread communication hardware resource.

16. The circuit arrangement of claim 15, wherein the first node is configured to determine whether the respective process is permitted to access the respective inter-thread communication hardware resource by determining whether the respective process is a mapped process in the process context translation data structure.

17. The circuit arrangement of claim 15, wherein the request by the respective hardware thread on behalf of the respective process to access the respective inter-thread communication hardware resource comprises a request to receive data from the respective inter-thread communication hardware resource by the respective hardware thread on behalf of the respective process, and wherein the first node is configured to grant the request to access the respective inter-thread communication hardware resource based at least in part on the permission data associated with the respective process indicating that the respective process is permitted to perform a receive type access of the respective inter-thread communication hardware resource.

18. The circuit arrangement of claim 15, wherein the request by the respective hardware thread on behalf of the respective process to access the respective inter-thread communication hardware resource comprises a request to send data to the respective inter-thread communication hardware resource by the respective hardware thread on behalf of the respective process, and wherein the first node is configured to grant the request to access the respective inter-thread communication hardware resource based at least in part on the permission data associated with the respective process indicating that the respective process is permitted to perform a send type access of the respective inter-thread communication hardware resource.

19. The circuit arrangement of claim 18, wherein the request by the respective hardware thread on behalf of the respective process to access the respective inter-thread communication hardware resource comprises a broadcast request.

20. The circuit arrangement of claim 15, wherein the first node is configured to deny the request to access the respective inter-thread communication hardware resource by signaling an exception to a hypervisor or supervisor.

21. The circuit arrangement of claim 15, wherein the first node is configured to, in response to determining that the respective process is permitted to access the respective inter-thread communication hardware resource, grant the request to access the respective inter-thread communication hardware resource by moving data between the respective inter-thread communication hardware resource and a register from a register file.

22. An integrated circuit device including the circuit arrangement of claim 15.

23. A program product comprising a non-transitory computer readable medium and logic definition program code stored on the computer readable medium and defining the circuit arrangement of claim 15.

* * * * *